(12) United States Patent
Chang

(10) Patent No.: US 7,944,585 B2
(45) Date of Patent: May 17, 2011

(54) COLOR INFORMATION ENCODING IN MONOCHROME PRINTING

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 811 days.

(21) Appl. No.: 11/676,259

(22) Filed: Feb. 16, 2007

(65) Prior Publication Data

US 2008/0198172 A1    Aug. 21, 2008

(51) Int. Cl.
*H04N 1/60* (2006.01)

(52) U.S. Cl. ......... 358/1.9; 358/1.1; 358/1.15; 358/3.23

(58) Field of Classification Search ................ 358/536, 358/1.9–3.3
See application file for complete search history.

(56) References Cited

U.S. PATENT DOCUMENTS

| | | | |
|---|---|---|---|
| 5,818,032 A | 10/1998 | Sun et al. | |
| 5,818,966 A | 10/1998 | Prasad et al. | |
| 5,946,414 A | 8/1999 | Cass et al. | |
| 6,141,441 A | 10/2000 | Cass et al. | |
| 6,757,078 B1 | 6/2004 | Bai et al. | |
| 6,996,269 B2 | 2/2006 | Ogawa et al. | |
| 7,003,166 B2 | 2/2006 | Abhyankar et al. | |
| 2004/0257378 A1* | 12/2004 | Braun et al. | 345/591 |
| 2005/0069197 A1* | 3/2005 | de Queiroz et al. | 382/162 |
| 2006/0125852 A1* | 6/2006 | Yamakado | 347/5 |
| 2007/0171439 A1* | 7/2007 | Kakutani | 358/1.9 |
| 2007/0201097 A1* | 8/2007 | Anderson et al. | 358/3.06 |
| 2007/0223044 A1* | 9/2007 | Bailey et al. | 358/3.06 |
| 2008/0198172 A1* | 8/2008 | Chang | 345/593 |

FOREIGN PATENT DOCUMENTS

| | | |
|---|---|---|
| JP | 11284867 | 10/1999 |
| JP | 2007060439 | 3/2007 |

* cited by examiner

*Primary Examiner* — Benny Q Tieu
*Assistant Examiner* — Marcellus Augustin
(74) *Attorney, Agent, or Firm* — Stolowitz Ford Cowger LLP

(57) ABSTRACT

An image processing system including a processor configured to analyze a color image to determine a set of target colors and a database including factor profiles associated with a set of stored colors. The image processing system further includes a printer controller that assigns the factor profiles to the target colors according to a color space proximity of the target colors with the stored colors. The factor profiles represent a combination of factors including a gray level and a screen angle.

20 Claims, 8 Drawing Sheets

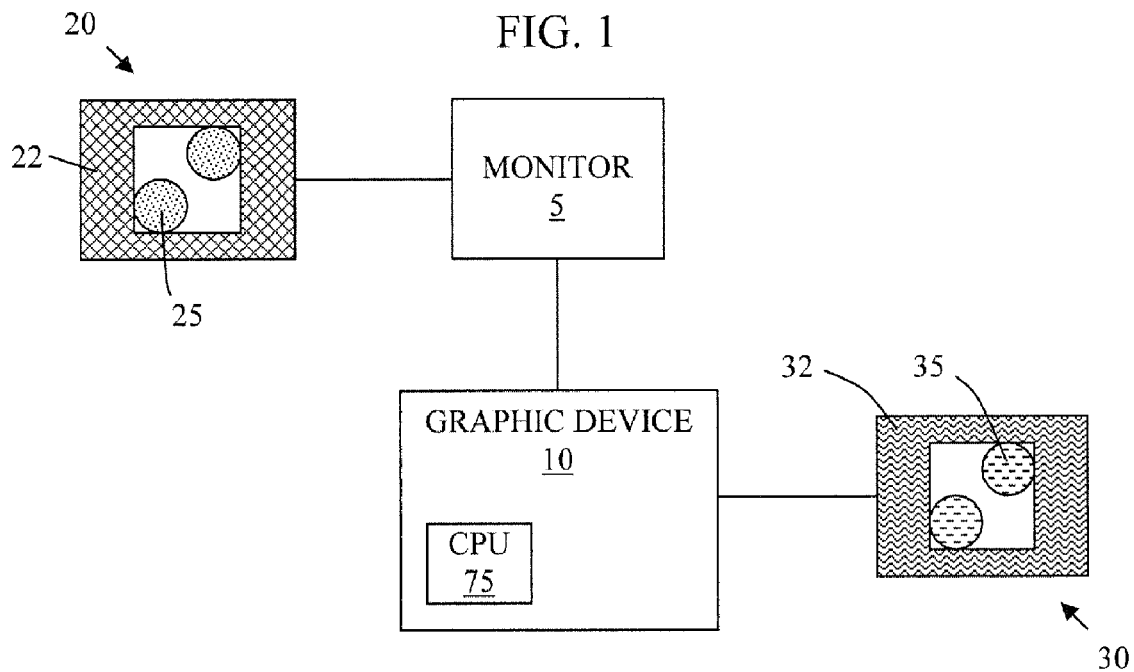
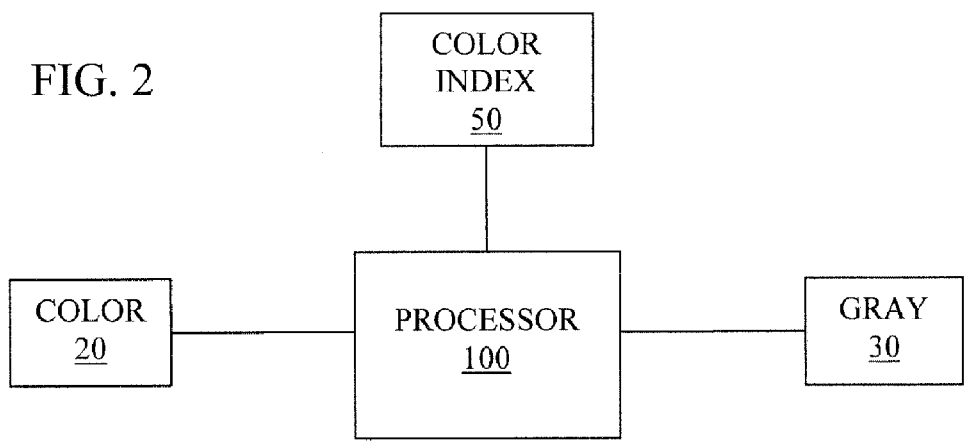

PRIOR ART

COLOR INFORMATION ENCODING IN MONOCHROME PRINTING

TECHNICAL FIELD

The invention relates to the retention of color information in a rendered monochrome print.

BACKGROUND

Printing a color image as a monochrome print involves converting the input colors into various levels or shades of a monochrome color, such as gray. The number of colors that may be generated and displayed on a conventional monitor are typically many more times that of the number of levels of gray which a printer is able to print. In addition to the printer being unable to represent each color as a unique gray level, the color information itself is typically lost during the color conversion and subsequent printing of the monochrome image.

Conventional systems have attempted to retain color information in a monochrome print by analyzing individual pixels arranged within a halftone cell, where each arrangement represents a color or colors which have been converted to grayscale. However, this approach fails to provide reliable and sufficient retention of the color information due to inevitable dot gain that blends or obfuscates the individual pixels. This makes it difficult to determine both the number of pixels being printed as well as the particular arrangement which is being represented in the halftone cell. As a result, a wrong color or no color may be associated with a particular pixel arrangement that has been printed in a monochrome image.

The present invention addresses these and other problems associated with the prior art.

BRIEF DESCRIPTION OF THE DRAWINGS

FIG. 1 illustrates an example block diagram of a monitor and a graphic device.

FIG. 2 illustrates an example block diagram of a processor and a color index table.

SUMMARY OF THE INVENTION

Figure 3:
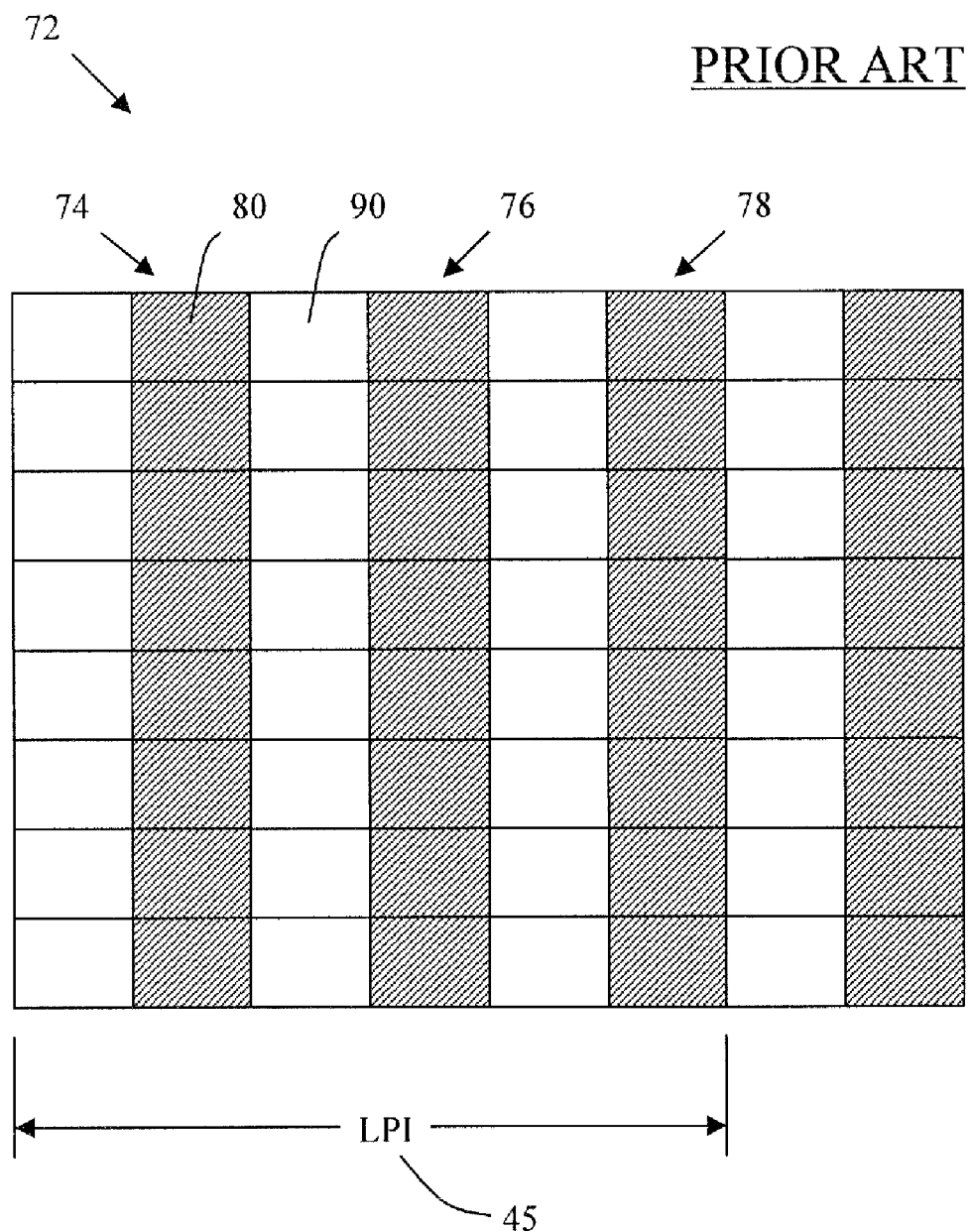
FIG. 3 illustrates an example screen known in the art, including multiple halftone cells.

An image processing system is herein disclosed as including a processor configured to analyze a color image to determine a set of target colors and a database including factor profiles associated with a set of stored colors. The image processing system further includes a printer controller that assigns the factor profiles to the target colors according to a color space proximity of the target colors with the stored colors. The factor profiles represent a combination of factors including a gray level and a screen angle.

A method is herein disclosed of analyzing a target color in a color image, selecting a group of factor profiles associated with a printed image and prioritizing the factor profiles according to an ease of identification. The method further includes converting the target color to a grayscale and assigning the factor profiles to the target color according to the priority of the factor profiles.

Logic is further herein disclosed that is encoded in one or more tangible media for execution and when executed operable to scan a printed image, segment the scanned image into white and halftone segments, and locate a prime pixel in a high density area of the halftone segment. The logic is further operable to identify a detection line passing through the prime pixel, determine a screen angle associated with the detection line, identify a factor index associated with the screen angle, and associate the factor index with a color.

The invention will become more readily apparent from the following detailed description of a preferred embodiment of the invention which proceeds with reference to the accompanying drawings.

DESCRIPTION OF EXAMPLE EMBODIMENTS

Whereas color images may be printed as color prints, they may also be converted to grayscale and printed as monochrome prints. Color conversion to grayscale may be accomplished when a printer is only capable of printing monochrome prints, for example when it only includes a black toner. In other instances, a user may want to print the color image as a monochrome image for effect, and selectively convert the color to grayscale using a color rendering algorithm. In yet other situations, a monochrome print may be selected in order to conserve color toner or to preview a document.

Regardless of the reason for rendering a color print as a monochrome print, there exist various ways of performing halftone operations and dithering patterns that are intended to render the color print as a monochrome print in an aesthetically pleasing manner. In some instances, more than one color may be represented as the same shade or tone in the monochrome print. This may be a function of the relatively limited number of gray levels available to a conventional printer compared with the large number of colors that may be displayed with a conventional monitor. In many cases, it may not matter to a viewer of a monochrome print if the selected gray level is representative of a light green or a light red for example. Two colors that may normally appear to be quit distinct to a person in a color image may instead be viewed as the identical gray level in the monochrome image so as to be indistinguishable from one another.

In some cases, it may not matter if a person is able to distinguish or determine what color is being represented by the selected gray level. Furthermore, it may be possible to refer to the original color image to determine the associated input colors. Where the original color image is not conveniently accessible, it may nevertheless be of interest to determine what colors are being represented in the monochrome image. However, it may not be practical to represent all of the displayed colors using only the limited number of gray levels available to the conventional printer.

Twenty four bits of color information may be used to specify a color displayed on a typical monitor that includes eight bits of data per each of three color channels. In practice, less bits may be used that will still provide an acceptable color palette for a human observer. For example, a nine bit color palette will provide an array of colors that will satisfy many user applications. A conventional printer may only be able to print a limited number of unique gray levels. In some cases a printer may print up to 101 gray levels for any given halftone dot. By including other printing features and characteristics other than gray level, retention of color information in a monochrome or grayscale image may be achieved.

FIG. 1 illustrates an example block diagram of a monitor 5 and a graphic device 10. The monitor 5 may include any conventional display device used to project an image. The projected image may be a color image, such as color image 20. The graphic device 10 may include any device capable of printing an image on a printed media. The printed image may be provided as a monochrome or grayscale image, such as monochrome image 30.

The color image 20 may be displayed or projected by the monitor 5 as including colors such as background color 22 and image color 25. The colors 22, 25 may be converted to grayscale by the graphic device 10, or a computer associated with the monitor 5 and graphic device 10, to create monochrome image 30. The monochrome image 30 may include a printed or scanned image having grayscale colors such as background tone 32 and image tone 35. Background tone 32 may be understood as representing a color conversion of background color 22. Similarly, image tone 35 may be understood as representing a color conversion of image color 25. Monochrome tones 32, 35 may be printed as grayscale or another printable color. In one embodiment, a black toner may be used to print the monochrome tones 32, 35.

The graphic device 10 may include a print controller or processor 75 that converts the color image 20 into the monochrome image 30, including an image understanding algorithm for recording color information into the grayscale colors. In one embodiment the graphic device 10 is a scanner that includes processing capabilities for interpreting the color information from the monochrome image 30. Graphic device 10 may include printing capabilities, scanning capabilities, or both.

FIG. 2 illustrates an example block diagram of a processor 100 and a color index table 50. The processor 100 may be provided in a computer, graphic device, printer, scanner or other device including processing capability. In one embodiment, the processor 100 includes a print controller. Processor 100 may convert the color image 20 into the monochrome image 30. The processor 100 may include an image understanding algorithm for recording color information into the monochrome image 30, or for interpreting the color information from the monochrome image 30. In one embodiment, the processor 100 is provided in the graphic device 10 as processor 75 of FIG. 1. The processor 100 may be associated with processing functions related to printing, scanning, or both.

FIG. 3 illustrates an example screen 72 known in the art, including multiple halftone cells 74, 76, 78. Halftone cells typically include a printed portion including enabled pixels such as printed pixel 80 and a white portion including disabled pixels such as white pixel 90. Halftone cells 74, 76, 78 may each be understood as including a halftone dot shaped as a line screen, or line pair. A screen frequency may be used to identify the number of halftone cells per unit distance.

Screen frequency 45 may be determined by counting the number of halftone line pairs per inch. For clarity and simplicity of representation, the screen 72 illustrates an example of providing three halftone line pairs per inch, although a typical screen frequency 45 will include more than a hundred such halftone line pairs per inch. Screen frequency 45, which may be indicated by the number of lines of halftone cells per inch (LPI), may affect the number of shades of gray that can be displayed or the resolution of an image that a printer is able to print. Depending on a resolution capability of the printer, the screen frequency and image resolution may be inversely related.

Figure 4:
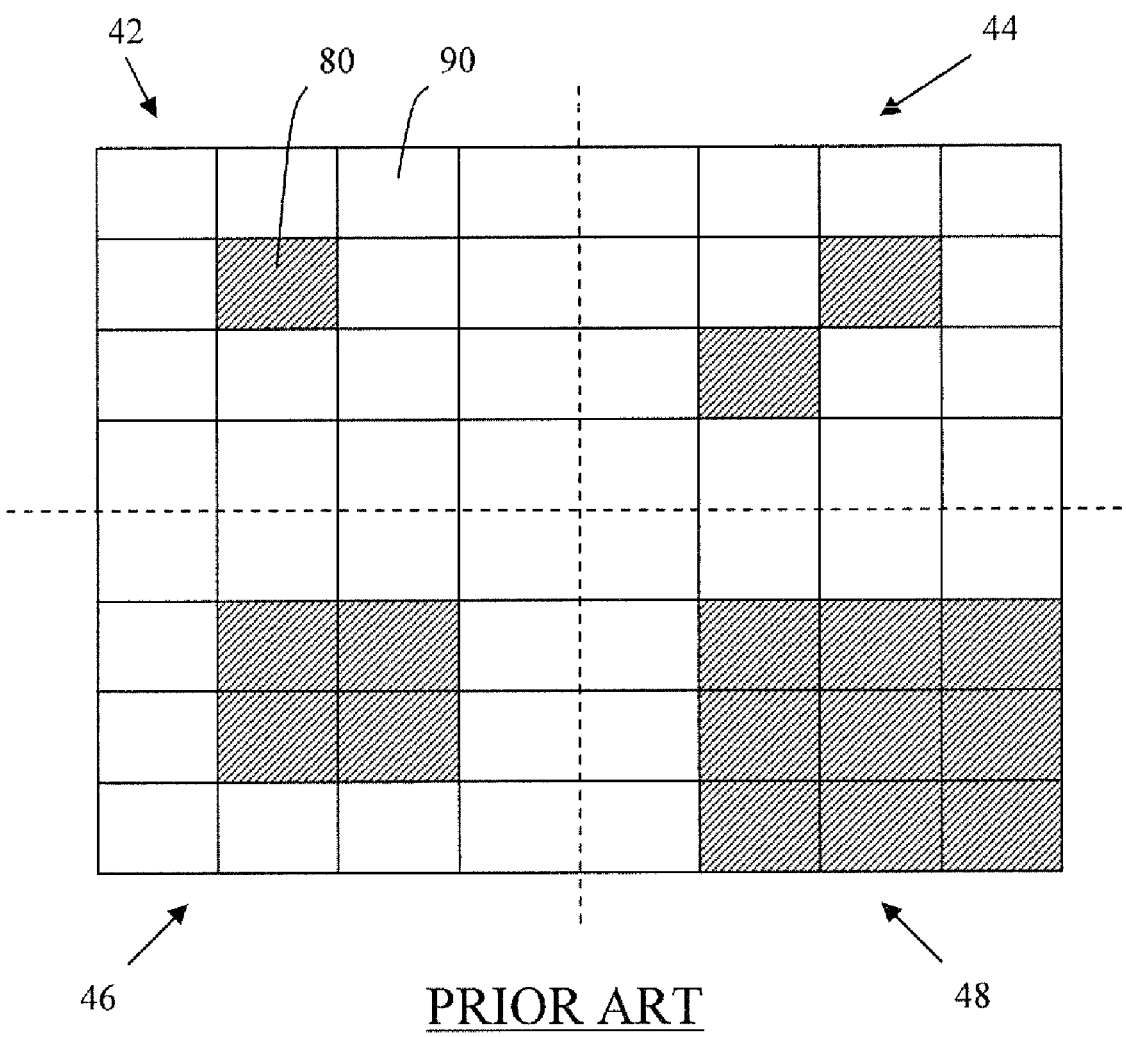
FIG. 4 illustrates a further example screen known in the art.

FIG. 4 illustrates a further example screen known in the art, including multiple halftone cells 42, 44, 46 and 48. Halftone cell 42 is shown as including a single printed pixel 80 surrounded by 14 white pixels, such as white pixel 90. Halftone cell 44 is shown as including two printed pixels. Halftone cell 46 is shown as including four printed pixels. Halftone cell 48 is shown as including nine printed pixels. The level of gray associated with any of the halftone cells 42, 44, 46, 48 may be determined by the number of printed pixels as well as the shape of the halftone cell. More printed pixels may be associated with a darker level of gray. Halftone cells which include clustered pixels may appear as a darker gray level than a halftone cell including an equal number of pixels arranged in a scattered pattern. Halftone cell 44 may be understood as having a darker gray level than halftone cell 42, where halftone cell 42 has the lightest gray level of the four halftone cells. Halftone cell 46 may be understood as having a darker gray level than halftone cell 44. Halftone cell 48 may be understood as having a darker gray level than halftone cell 46, where halftone cell 48 has the darkest gray level of the four halftone cells.

Figure 5:
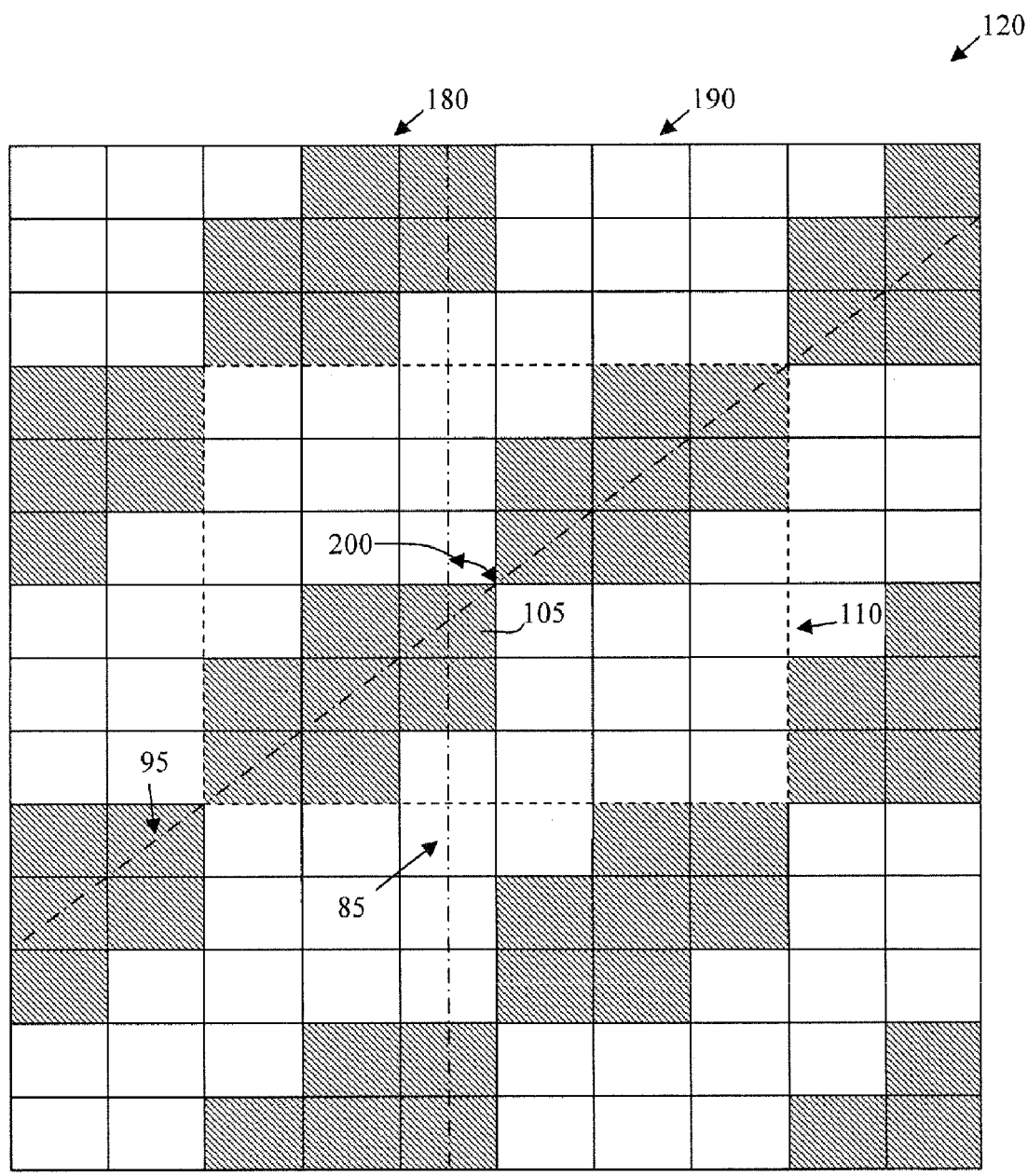
FIG. 5 illustrates an example screen or device space including a halftone segment and a white segment.

FIG. 5 illustrates an example screen or print space 120 including a halftone segment 180 and a white segment 190. Halftone segment 180 may include multiple halftone cells and halftone dots. Screen 120 illustrated in FIG. 5 is shown as including diamond shaped halftone dots. The white segment 190 is the area of the screen 120 that does not include any halftone dots. The white segment 190 may be understood as being paper white.

Screen 120 may be understood as being part of a print space including a printed image, such as monochrome image 30 of FIG. 1. For example, screen 120 may be associated with the image tone 35. The proximity of printed pixels, halftone dots and their amount of overlap may be used to determine a gray level for the screen 120 and hence the image tone 35.

In one embodiment, the screen 120 is part of a scanned image. For example a printed image may be scanned by the graphic device 10 of FIG. 1. The halftone segment 180 may be understood as having pixels which are enabled or turned on, whereas the white segment 190 may be understood has having the pixels disabled or turned off. A processor, such as processor 100 of FIG. 2 may be used to segment the scanned image into the halftone segment 180 and the white segment 190.

One of the printed or enabled pixels may be identified as a prime pixel 105 that is located in an approximate center of the screen 120, or in a high density area of the halftone segment 180. A detection line 95 is identified as passing through the prime pixel 105 and intersecting the greatest number of adjacent or neighboring pixels. A frequency line 85 is identified as being formed at an angle 200 to the detection line. In one embodiment, the angle 200 is provided as forty five degrees.

A halftone segment 110 is identified as being formed about an approximate center point at or near the prime pixel 105. The halftone segment is shown as including thirty six pixels arranged in a six by six pixel arrangement, although it may include fewer or more of the pixels in the screen 120. In one embodiment, a gray level for the halftone segment 110 is identified according to a density of printed or enabled pixels in a localized area around the prime pixel 105.

Figures 6, 7A:
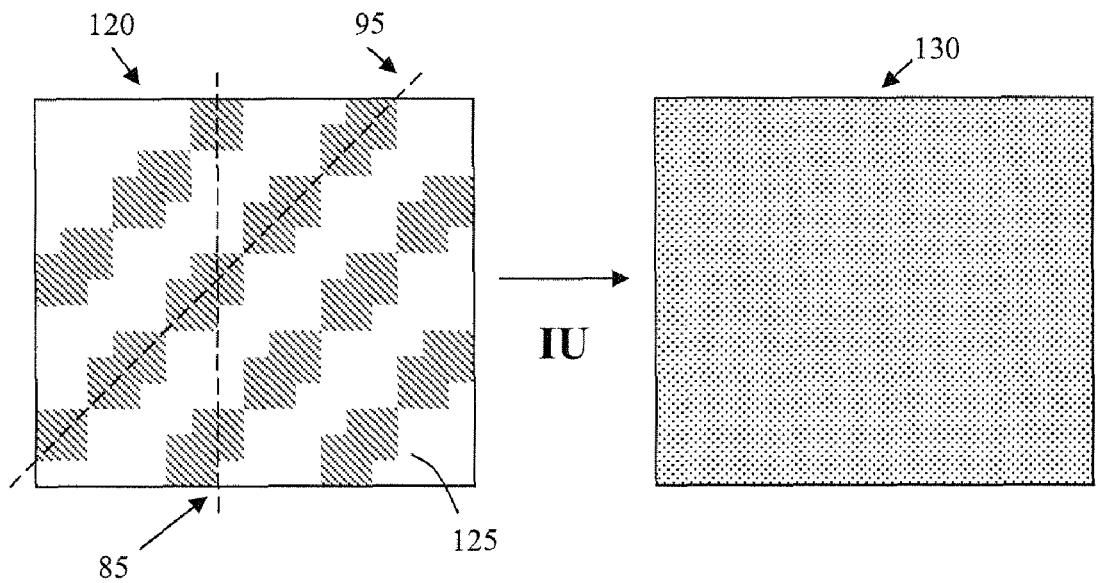
FIG. 6 illustrates an example color index table.
FIG. 7A illustrates an example operation of an image understanding algorithm including the example screen of FIG. 5.

FIG. 6 illustrates an example of a color index table such as the color index table 50 of FIG. 2. Color index table 50 may be included in a table or database, which is accessible to a processor, such as processor 100 of FIG. 2. The color index table 50 may include a factor profile 66 and multiple fields associated with one or more entries. One of the fields may include a gray level 55 of the scanned or printed monochrome image. The gray level 55 may be provided a value L that identifies a percentage or number of bits that have been printed or enabled in a halftone cell or halftone segment, such as halftone segment 110 of FIG. 5. In one embodiment, the gray level 55 is normalized by normalizing value of (255), where (255) is associated with 100% black and (0) is associated with 0% black, or paper white.

Another field in the color index table 50 may be provided to identify a factor index 60. The factor index 60 may include factors such as halftone dot shape S, screen angle A and screen frequency F. The factor dot shape S may identify any of a line screen, Euclidian screen, diamond dot, round dot, elliptical dot, square dot or any other dot shape known in the art. In one embodiment, the factor dot shape S includes cluster type dot shapes, where the enabled or printed pixels are centralized or clustered about each other. Dot shapes that include dispersed or scattered pixels may also be described by the factor dot shape S which identifies the pixel pattern or arrangement. A dot size may also be considered in addition to, or as part of, the dot shape S. For example, a large square halftone dot may be associated with a different dot shape S than a small halftone square dot.

The factor screen angle A may identify the screen angle 200 illustrated in FIG. 5. The screen angle A may include values such as 0, 15, 30, 45, 60, 75, 90, 105, 120, 135, and 165 degrees. In one embodiment twelve different screen angles A may be identified in the color index table 50. More or fewer screen angles A may be printed or detected. The factor screen frequency F may identify the screen frequency 45 of FIG. 4. Screen frequency F may include a number of rows or lines of halftone cells per inch LPI. In one embodiment, each of the factors S,A,F are provided as separate fields in the color index table 50.

Another field in the color index table 50 may be provided to identify a factor priority 65 associated with the factor index 60. The factor priority 65 may be assigned according to a confidence level or processing speed of detecting one or more of the factors S,A,F in a printed or scanned image, such as monochrome image 30 of FIG. 1. In one embodiment, the factor priority 65 is provided as a scaled, numeric value N associated with the ease of detecting one or more of the factors S,A,F.

In addition, a field may be provided in the color index table 50 that identifies a target color 70. Target color 70 may be associated with the factor index 60 and the gray level 55. More than one target color 70 may be associated with the same gray level 55. For example, two target colors may be associated with a gray level L, whereas a first target color is further associated with a first index factor and the second target color is associated with a second index factor. The first and second target colors may be included as different entries in the color index table 50. The target color 70 may be defined in a red, green, blue RGB color space, in which case the target color may be identified by a RGB color tuple. The factor profile 66 may include any or all of the gray level 55, the factor index 60, the factor priority 65 and the target color 70.

The processor 100 of FIG. 2 may be used to detect or identify one or more target colors such as colors 22, 25 associated with color image 20 in FIG. 1. The target color 25 may be compared to the list of stored target colors 70 in the color index table 50 in order to determine a best color match between the target color 25 and the stored color 70. In one embodiment, color vector error diffusion may be used to measure the target color 25 and analyze it to determine a stored color 70 that has the shortest color distance from the target color 25. A print controller or processor, such as processor 100 of FIG. 2 may assign a factor profile or factor index 60 according to the color space proximity between the target color 25 and the stored color 70. Any or all of the values for gray level L, dot shape S, screen angle A and screen frequency F may be used to associate the factor profile 66 with the target color 25.

The gray level 55 and factor index 60 may be used to retrieve color information from an image, such as monochrome image 30, or to record or encode color information into the monochrome image 30. The gray level L and factors S,A,F may be incorporated or encoded into a grayscale or monochrome image 30 to retain a memory of the target colors associated with a color image, such as color image 20 of FIG. 1.

Each of the factors S,A,F or the factor index 60 may be assigned a priority according to an ease of detection in grayscale or monochrome image. The ease of identification may be determined according to a confidence level or processing speed of detecting the factors S,A,F in the grayscale image.

In one embodiment, there are twelve screen angles associated with screen angle A, four dot shapes associated with dot shape S and four frequencies associated with screen frequency F. Each combination of screen angle A, dot shape S and screen frequency F may be associated with a different gray level L. Each combination may be identified by a factor index 60 or a factor profile 66. If we assume there are 101 different gray levels, and for each gray level there are 12×4×4 or 96 factor indices, this may result in accommodating approximately fourteen bits of color information in the monochrome image. Some applications use an index color space may include a subset of the available monitor colors. Nine or ten bits of color information may be sufficient to represent the index color space.

Gray levels that are near 0% or near 100% may have fewer combinations of factors available to them due to the size of the halftone dot associated with each. Gray levels of 0% and 100% may only have one factor index 60 associated with them. Increasing the number or type of screen angle A, dot shape S or screen frequencies F may serve to accommodate additional bits of color information up to and including the total number of color bits that may be displayed by a monitor.

FIG. 7A illustrates an example operation of an image understanding IU algorithm for analyzing an image, such as monochrome image 30 of FIG. 1, including the example print space or screen 120 of FIG. 5. The IU algorithm may be performed by a processor such as processor 100 of FIG. 2. The detection line 95 may be used to determine the screen angle A of the screen 120. The frequency line 85 may be used to determine the screen frequency F of the screen 120. Similarly, a diamond dot halftone shape 125 and associated gray levels may be analyzed by the processor 100 to determine the target color 70 associated with the factor profile 66 in the color index table 50. In this example operation, the screen 120 is determined by the processor 100 to be associated with a square image including target color 130. Both the target color 130 and the shape or arrangement of pixels may therefore be encoded and retained in the screen 120.

Figure 7B:
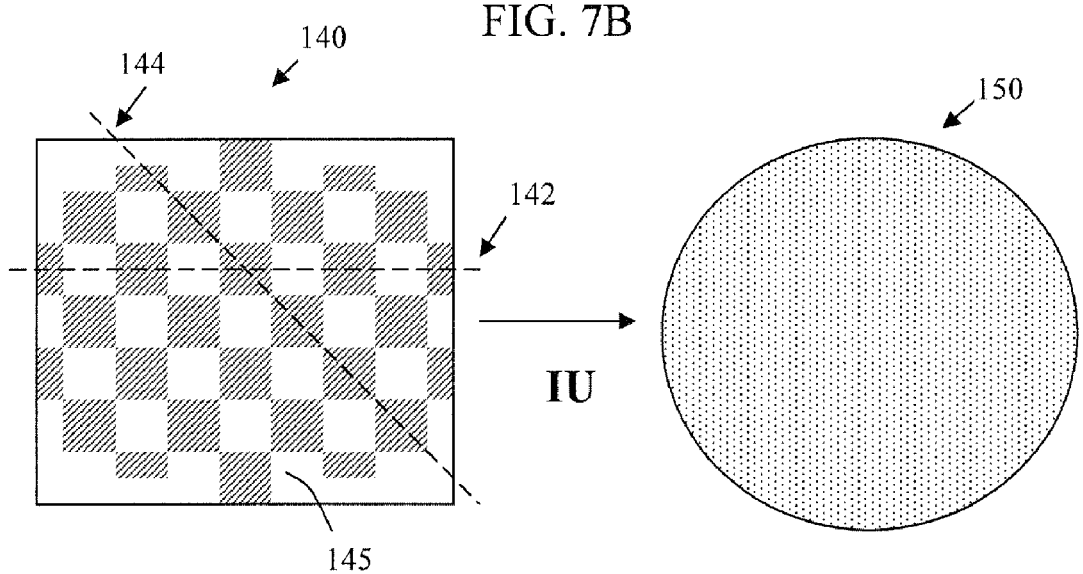
FIG. 7B illustrates an example operation of a further embodiment of an image understanding algorithm.

FIG. 7B illustrates an example operation of a further embodiment of an image understanding algorithm when operated on a further example print space or screen 140. Screen 140 may be analyzed by the processor 100 to determine detection line 144 and frequency line 142. The square dot halftone shape 145 and associated gray levels may be analyzed by the processor 100 to determine the target color 70 associated with the factor profile 66 in the color index table 50. In this example operation, the screen 130 is determined by the processor 100 to be associated with a circular image including target color 150. Both the target color 150 and the shape or arrangement of pixels may therefore be encoded and retained in the screen 130.

Figure 7C:
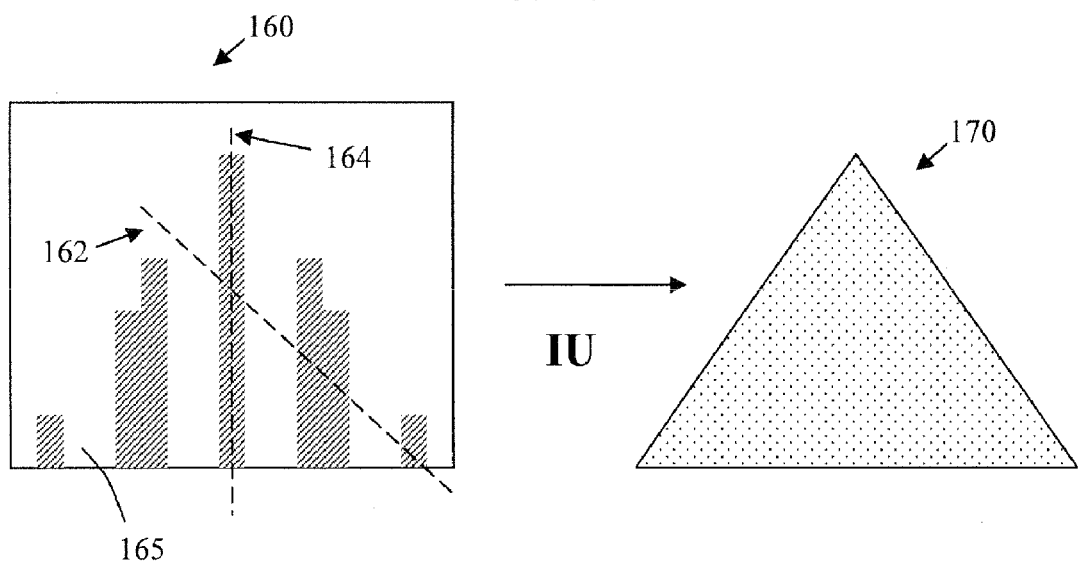
FIG. 7C illustrates an operation of yet another embodiment of an image understanding algorithm.

FIG. 7C illustrates an operation of yet another embodiment of an image understanding algorithm including a print space or screen 160. Screen 160 may be analyzed by the processor 100 to determine detection line 164 and frequency line 162. The line screen dot halftone shape 165 and associated gray levels may be analyzed by the processor 100 to determine the target color 70 associated with the factor profile 66 in the color index table 50. In this example operation, the screen 160 is determined by the processor 100 to be associated with a triangular image including target color 170. Both the target color 170 and the shape or arrangement of pixels may therefore be encoded and retained in the screen 140.

Figure 8:
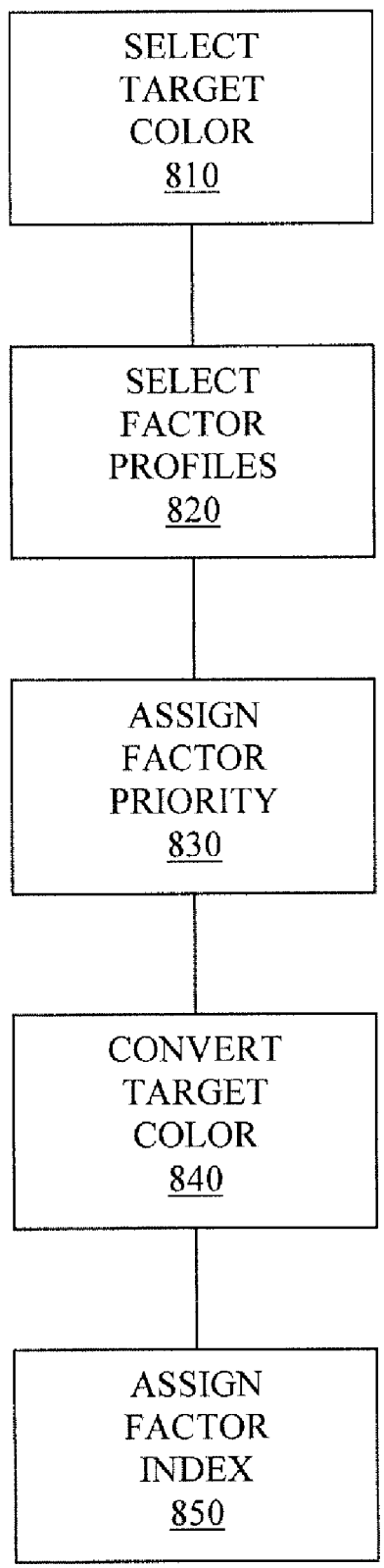
FIG. 8 illustrates a method of selecting a target color and assigning a factor index.

FIG. 8 illustrates a method of selecting a target color, such as target color 70 of FIG. 6, and assigning the factor index 60 identifying the factor profile 66. At operation 810, a target color in a color image such as color image 20, is selected and analyzed. The target color may be statistically analyzed to determine a frequency of use At operation 820, a group of factors associated with a printed image are selected. The factor may include factors such as a gray level L, a halftone dot shape S, a screen angle A, and a screen frequency F. The factor profile 66 may be associated with the factors S,A,F and the factor index 60.

At operation 830, the factor profiles 66 are prioritized according to an ease of identification of the factors. The ease of identification may be made with respect to one of the factors or a combination of factors. The ease of identification may be determined according to a processing speed of detecting the factor profiles 66 in a scanned grayscale image. In one embodiment, a line screen dot shape is the easiest to detect. In another embodiment, screen angles of 0, 45, 90 and 135 degrees are easiest to detect. In yet another embodiment, lower screen frequencies are easier to detect.

At operation 840, the target color is converted to a gray level using a selected algorithm. Each of the color pair values between the target value and the converted gray level may be recorded. One or more target values may be converted to the same gray level.

At operation 850, the factor profiles 66 are assigned to the target color according to the priority of the factor profiles 66. Where more than one target value has been converted to the gray level, the most frequent target color may be associated with the factor profile 66 that has been identified as being the highest priority, or the easiest to identify.

Figure 9:
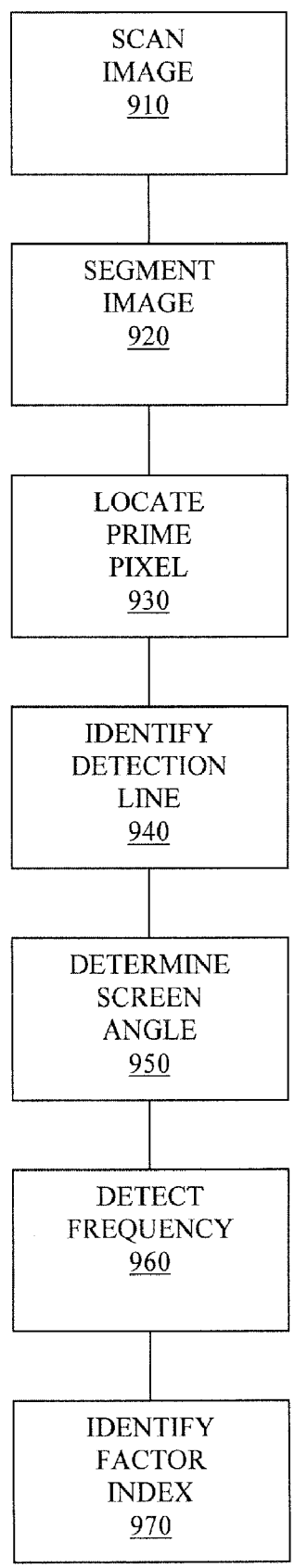
FIG. 9 illustrates a method of scanning an image and identifying a factor index associated with a color.

FIG. 9 illustrates a method of scanning an image and identifying a factor index 60 associated with color. At operation 910, a printed image is scanned, for example as monochrome image 30 of FIG. 1.

At operation 920, the scanned image is segmented into different segments, for example the white segment 190 and the halftone segment 180 illustrated in FIG. 5.

At operation 930, a prime pixel 105 is located. The prime pixel 105 may be located at or near the center of a high density area of the halftone segment 180.

At operation 940, a detection line 95 is identified. The detection line 95 may be identified as passing through the prime pixel 105. In one embodiment, the detection line 95 is determined according to an intersection of the detection line 95 with the greatest number of pixels.

At operation 950, a screen angle A associated with the detection line 95 is determined. In one embodiment, the screen angle A is measured clockwise in degrees, where zero degrees is determined at 9:00 on a 12 hour clock. A screen frequency F of the halftone segment 180 may also be detected. In one embodiment, the screen frequency F is detected along a frequency line 85 inclined forty five degrees from the detection line 95.

At operation 960, a factor index 60 associated with the screen angle A is identified. The factor index 60 may further be associated with the screen frequency F, the dot shape S, and the gray level L. The gray level L for the halftone segment 180 may be determined according to a pixel density in a localized area around the prime pixel 105.

At operation 970, the factor index 60 is associated with a color, for example the target color 70 identified in the color index table 50 of FIG. 6. The color information may therefore be reclaimed from the monochrome image 30, where the monochrome image 30 was previously rendered from a color image, such as color image 20. The color information may be use to restore the color image 20 using stored target colors that approximate the original colors rendered from the color image 20. In one embodiment, the factor indices 60 are associated with the stored target colors 70.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An image processing system comprising:
a database including factor profiles associated with stored monochrome colors;
a printer controller that assigns the factor profiles to target colors determined from a color image according to a color space proximity of the target colors with the stored monochrome colors, where the factor profiles represent a combination of factors including a gray level and a screen angle, where each of the factor profiles identifies a monochrome color having a different combination of the gray level and the screen angle, and where the gray level and the screen angle are incorporated into a monochrome image comprising the stored monochrome colors to retain a memory of the target colors associated with the color image; and
a processor configured to:
analyze the color image to determine the target colors;
locate a prime pixel in a high density area of the monochrome image; and associate the screen angle of the monochrome image as passing through the prime pixel and through a highest number of pixels in a vicinity of the prime pixel.

2. The image processing system according to claim 1 where each of the factors are assigned a priority according to an ease of detection in the monochrome image.

3. The image processing system according to claim 2 where the ease of detection is determined according to a confidence level of detecting the factors in the monochrome image.

4. The image processing system according to claim 1 where the factors further include a screen frequency.

5. The image processing system according to claim 4 where the screen angle and the screen frequency are determined by selecting a detection line passing through the highest number of pixels.

6. The image processing system according to claim 1 where the factors further include a cluster type dot shape.

7. The image processing system according to claim 1 where a first screen angle passing through the prime pixel is associated with a first target color, where a second screen angle passing through the prime pixel is associated with a second target color, and where both the first and second target colors are associated with a same gray level.

8. A method comprising:
analyzing a target color in a color image;
locating a prime pixel in a high density area associated with a monochromatic representation of the color image;
associating a screen angle of the monochromatic representation as passing through the prime pixel and through a highest number of pixels in a vicinity of the prime pixel;
selecting a group of factor profiles associated with the monochromatic representation, where the factor profiles comprise one or more factors including the screen angle;
prioritizing the factor profiles according to an ease of identification of the one or more factors in the monochromatic representation;
converting the target color to a monochrome color;
assigning a factor profile to the target color based, at least in part, on the priority of the factor profiles; and
printing the monochromatic representation with a printer, where the monochromatic representation comprises the monochrome color and the one or more factors, and where a memory of the target color is retained in the monochromatic representation as a combination of the monochrome color and the assigned factor profile.

9. The method according to claim 8 where the one or more factors further include a screen frequency.

10. The method according to claim 8 where the one or more factors further include a dot shape.

11. The method according to claim 8 where the ease of identification is determined according to a processing speed of detecting the factor profiles in a scanned monochrome image.

12. The method according to claim 8, further comprising:
scanning the printed monochromatic representation;
identifying the monochrome color and the one or more factors from the scanned monochromatic representation;
associating the monochrome color and the one or more factors with the target color; and
restoring the color image comprising the target color.

13. The method according to claim 12, further comprising:
identifying a detection line passing through the prime pixel; and
determining the screen angle corresponding with the detection line.

14. A non-transitory computer readable medium having stored thereon computer-executable instructions that, in response to execution by a computing device of a system, cause the system to:
scan a printed image;
segment the scanned image into white and halftone;
locate a prime pixel in a high density area of the halftone segment;
identify a detection line passing through the prime pixel and through a highest number of pixels in the high density area;
determine a screen angle associated with the detection line;
identify a factor index associated with the screen angle;
associate the factor index with a color;
reclaim the color from the printed image, where the printed image is a monochrome image that was rendered from a color image; and
restore the color image using stored colors that approximate original colors rendered from the color image, where the factor index is associated with one of the stored colors.

15. The non-transitory computer readable medium according to claim 14 where execution of the computer-executable instructions by the computing device further causes the system to detect a screen frequency of the halftone segment along a frequency line inclined forty five degrees from the detection line.

16. The non-transitory computer readable medium according to claim 14 where execution of the computer-executable instructions by the computing device further causes the system to determine the screen angle of the detection line according to an intersection with the highest number of pixels.

17. The non-transitory computer readable medium according to claim 14 where execution of the computer-executable instructions by the computing device further causes the system to determine a gray level for the halftone segment according to a pixel density in a localized area around the prime pixel.

18. The non-transitory computer readable medium according to claim 17 where the factor index is further associated with the gray level.

19. The non-transitory computer readable medium according to claim 14 where the monochrome image consists of black toner printed on paper, and where the color image is displayed on a monitor including the stored colors of Red Green Blue (RGB) color tuples.

20. A method comprising:
scanning a printed image;
segmenting the scanned image into white and halftone;
locating a prime pixel in a high density area of the halftone segment;
identifying a detection line passing through the prime pixel and through a highest number of pixels in the high density area;
determining a screen angle associated with the detection line;
identifying a factor index associated with the screen angle;
associating the factor index with a color;
reclaiming the color from the printed image, where the printed image is a monochrome image that was rendered from a color image; and
restoring the color image using stored colors that approximate original colors rendered from the color image, where the factor index is associated with one of the stored colors.

* * * * *